United States Patent Office 3,564,005
Patented Feb. 16, 1971

3,564,005
METHOD FOR PREPARING SUBSTITUTED TETRAZOLE
Hermann S. Haiss, Indian Head, Md., assignor to the United States of America as represented by the Secretary of the Navy
No Drawing. Filed Feb. 8, 1968, Ser. No. 707,371
Int. Cl. C07d 55/56
U.S. Cl. 260—308                         7 Claims

ABSTRACT OF THE DISCLOSURE

A method for converting the 1-isomer of methyl-5-vinyl tetrazole into the useful energetic plasticizer, 5-($\beta$-hydroxyethyl)-1-methyl tetrazole whereby the 1-isomer is reacted with a solution of a strong base.

BACKGROUND OF THE INVENTION

This invention relates generally to an energetic plasticizer for improving the mechanical properties and thermal stabilities of high energy propellant compositions, and more particularly, to a method for preparing the energetic plasticizer, 5-($\beta$-hydroxyethyl)-1-methyl tetrazole.

The 1 and 2 isomers of methyl-5-vinyl tetrazole are valuable monomers for the preparation of high nitrogen content, high energy, acrylic acid copolymerization products. The methyl-5-vinyl tetrazole/acrylic acid copolymer is generally compatible with single and double base propellant formulations and is useful as a fuel matrix or binder for propellants and explosives of various types. In the preparation of this material, it has been found that only the 2-isomer, 2-methyl-5-vinyl tetrazole, is useful for preparing the copolymerization reaction, while the 1-isomer, 1-methyl-5-vinyl tetrazole, remains essentially inert. However, since the prior art techniques for preparing methyl-5-vinyl tetrazole necessarily results in the mixture of isomers, the 1-isomer, which accounts for approximately 48% of the mixture, was being discarded. In view of the economic waste inherent in this procedure, it was considered desirable to provide for a method of converting the 1-isomer into a useful product which preferably would take advantage of the previously lost high nitrogen content and good explosive potential of the 1-isomer.

SUMMARY OF THE INVENTION

Accordingly, it is an object of this invention to provide a method for converting the previously discarded 1-methyl-5-vinyl tetrazole into a useful high energy composition.

It is further an object of this invention to provide a method for providing an energetic plasticizer of good energy potential and good thermal stability.

It is further an object of this invention to provide a method for providing a plasticizer composition with good compatibility with polymeric fuel binder compositions, and particularly with copolymers of 2-methyl-5-vinyl tetrazole and acrylic acid.

These and other objects are accomplished by providing a method for converting 1-methyl-5-vinyl tetrazole into the energetic plasticizer, 5-($\beta$-hydroxyethyl)-1-methyl tetrazole, by treating the 1-methyl-5-vinyl tetrazole with a strong base.

DETAILED DESCRIPTION OF THE PREFERRED EMBODIMENTS

The energetic plasticizer 5-($\beta$-hydroxyethyl)-1-methyl tetrazole is prepared by the reaction of a strong base with 1-methyl-5-vinyl tetrazole. This reaction is most conveniently performed by refluxing about 0.5% to about 5% by weight of a solution of a strong base with 1-methyl-5-vinyl tetrazole, for a time sufficient to convert the latter into the desired product, 5-($\beta$-hydroxyethyl)-1-methyl tetrazole. Preferably for best results, the base is used in an amount of from about 0.5% to about 2% by weight. The reaction is normally complete after about one to four hours and may be stopped at any time by neutralizing the excess base with a suitable acid, such as hydrochloric acid.

One of the surprising aspects of this technique is that it is unnecessary to separate the 1-methyl-5-vinyl tetrazole from 2-methyl-5-vinyl tetrazole prior to the base reaction. Unexpectedly, it has been found that only the 1-isomer will react with the base while the 2-isomer seems to remain substantially uneffected and can be treated for further copolymerization with the acrylic acid. It has been found that when the base reaction is performed prior to separation of the isomers, the residual 2-isomer will demonstrate a much greater tendency to polymerize than those samples obtained by fractional distillation of the 1-isomer from the 2-isomer. It is desirable, therefore, to first form the 5-($\beta$-hydroxyethyl)-1-methyl tetrazole from the 1-isomer before the subsequent reaction with the 2-isomer.

For the purposes of this technique, any strong inorganic base can be used, such as sodium hydroxide, potassium hydroxide, magnesium hydroxide and the like. Basic organic compounds, such as dimethylamine, have been reacted successfully but because of the high basicity of their products, no practical utility has been found for these compounds.

Any prior art method for preparing methyl-5-vinyl tetrazole may be used for providing the isomer mixture used in this invention. Several particularly good techniques are taught by Finnegan et al., U.S. Pat. 3,004,959, issued Oct. 17, 1961 and Finnegan et al., U.S. Pat. 3,055,-911, issued Sept. 25, 1962, the teachings of both of which are herein incorporated by reference. According to the Finnegan et al. techniques, potassium 5-hydroxyethyl tetrazole is treated with dimethylsulfate in the presence of potassium bicarbonate.

Following the formation of the desired plasticizer, 5-($\beta$-hydroxyethyl)-1-methyl tetrazole, the 2-isomer may be separated by simple distillation and isolated by extraction with a suitable solvent, such as methylene chloride or the like.

Having generally described the invention, the following specific examples are presented for purposes of illustration.

EXAMPLE

Preparation of 5-($\beta$-hydroxyethyl)-1-methyl tetrazole

After refluxing 200 g. of the 1 and 2 isomer mixture of methyl-5-vinyl tetrazole with 10 g. sodium hydroxide in 1000 ml. water for three hours, 30 ml. concentrated hydrochloric acid was added and the water/2-methyl-5-vinyl tetrazole aliquot is distilled off under reduced pressure (120 mm.) by means of a rotavapor. The dark brown residue was heated for an additional 30 minutes at 100° C./50 mm. and then extracted with 300 ml. acetone. After drying the acetone extract over sodium sulfate the solvent was removed, the remaining brown oil dissolved in methylene chloride (100 ml.) and filtered through acidic alumina (15 inch column, 1.75 inch diameter). The evaporation of methylene chloride (first at 50–60° C./atmospheric pressure, then at 90–100° C./10 mm.) gave 98 g. of crude 5-($\beta$-hydroxyethyl)-1-methyl tetrazole which can be directly used as plasticizer or distilled at 180° C./0.05 mm. in a Hickman Vacuum Still to give a colorless liquid (yield 92 g.). The water distillate of 2-methyl-5-vinyl tetrazole was extracted with three 150 ml. portions of methylene chloride and the combined extracts were dried over sodium sulfate. After 15–20 hours the solvent was removed. During this operation the water bath temperature should not exceed 60° C. because above this temperature polymerization occurs. In order to remove the last traces of solvent the residue was then heated an additional 20 minutes at 60° C./50 mm.

The resulting colorless 2-methyl-5-vinyl tetrazole (78 g.) is highly pure (99–100%) and shows a much higher tendency to polymerize than those samples that were obtained by fractional distillation of the isomer mixture.

Crude 5-(β-hydroxyethyl)-1-methyl tetrazole has a viscosity of 52 cps. at 25° C. The DTA shows an endotherm at 253° C. and exotherms at 278° C. and 364° C.

Obviously numerous modifications and variations of the present invention are possible in light of the above teachings without varying from the spirit and scope thereof. It is therefore to be understood that the invention is not intended to be limited except by the appended claims.

What is claimed as new and desired to be secured by Letters Patent of the United States is:

1. A method for preparing 5-(β-hydroxyethyl)-1-methyl tetrazole which comprises refluxing an aqueous solution of a strong inorganic base with methyl-5-vinyl tetrazole.

2. The method of claim 1 wherein said strong inorganic base is selected from the group consisting of sodium hydroxide and potassium hydroxide.

3. The method of claim 1 wherein said aqueous solution is from about 0.5% to about 5.0% by weight of said strong inorganic base.

4. The method of claim 3 wherein said aqueous solution is from about 0.5% to about 2.0% by weight of said strong inorganic base.

5. The method of claim 1 wherein said methyl-5-vinyl tetrazole is a mixture of the 1 and 2 isomers of methyl-5-vinyl tetrazole.

6. The method of claim 1 wherein said methyl-5-vinyl tetrazole is 1-methyl-5-vinyl tetrazole.

7. The method of claim 1 wherein said reaction is performed by refluxing the methyl-5-vinyl tetrazole with an aqueous solution of a strong inorganic base for a period of time of from 1 to about 4 hours.

References Cited

UNITED STATES PATENTS

| | | | |
|---|---|---|---|
| 3,055,911 | 9/1962 | Finnegan et al. | 260—308.4 |
| 3,351,627 | 11/1967 | Henry | 260—308.4 |

FOREIGN PATENTS

| | | | |
|---|---|---|---|
| 1,131,692 | 6/1962 | Germany | 260—308.4 |

LELAND A. SEBASTIAN, Primary Examiner

U.S. Cl. X.R.

149—109